Patented Dec. 27, 1938

2,142,078

UNITED STATES PATENT OFFICE 2,142,078

INITIALLY LIGHT COLORED PHENOL-ACETALDEHYDE RESIN

John B. Rust, Orange, N. J., assignor to Ellis-Foster Company, a corporation of New Jersey No Drawing. Application August 31, 1936, Serial No. 98,738

10 Claims. (Cl. 260—2)

This invention relates to light-colored, oil-soluble phenolic-aldehyde resins and a process of making same.

It is well-known that phenolic-formaldehyde resins either of the permanently fusible or heat-hardening type in which the phenolic constituent is phenol, cresol or cresylic acid, are insoluble in drying oils. They may be rendered soluble, however, by first fusing them with a major proportion of some natural resin or resin ester such as rosin or ester gum. It is also well-known that modifying agents such as the above give unsatisfactory varnish resins since they detract from the desirable features of the pure phenolic resin. It has therefore been the object of searchers to produce a pure phenolic resin which was soluble in drying oils without the aid of modifying agents. This has been accomplished by using phenols having relatively high molecular weight side chains such as butyl phenol, amyl phenol, hexyl phenol, phenyl phenol and the like. The latter type may be termed synthetic phenols, not being readily available and therefore relatively costly at present.

Obviously it would be desirable to employ, from an economic standpoint, the naturally occurring, relatively inexpensive simple phenols, such as phenol, cresol and cresylic acid in the production of oil-soluble resins.

It has been found that acetaldehyde reacts with the simple phenols to yield readily oil-soluble resins. However, heretofore the resinous condensation products of acetaldehyde and the simple phenols could only be made inexpensively very dark colored and were, therefore, unsuitable in drying oil varnishes. In applications Serial Number 39,621, filed September 7, 1935; Serial Number 51,475, filed November 25, 1935; Serial Number 51,888, filed November 27, 1935, and Serial Number 67,302, filed March 5, 1936, I have described a process of making light-colored phenolic-acetaldehyde resins which are especially adaptable for making drying oil varnishes by virtue of their ready oil-solubility, without the necessity of adulterating modifiers, and extreme lightness in color. In general the processes of the above applications require the use of oxalic acid as a catalyst or co-catalyst in forming the resins. It was found that oxalic acid possesses the remarkable property of causing phenolic-acetaldehyde resins, made in its presence, to bleach when the resin is heated above about 180° C. The discovery of this phenomenon allowed the simple production of pale colored resins where before only dark-colored ones could be obtained. The phenomenon is termed heat-bleaching and gives a relatively pale-colored resin from a relatively dark-colored resin by the simple expedient of raising the temperature of the fused resin above a certain critical value usually about 180° C. The oxalic acid is called a bleaching catalyst.

The color of the final resin depends upon several factors; among them are the color of the starting materials and the proportion of oxalic acid present during reaction. If the starting materials are water-white or straw-colored, the final resin in general will be substantially water-white or straw-colored. In previous known process of making phenolic-acetaldehyde resins no matter what the color of the starting material the final resin was relatively dark and in many cases black, especially where resinification temperatures were in the boiling range of the reactants, for instance, from about 60° C. to 120° C. Since the resins described in the above applications are light-colored, very light-colored varnishes may be made from them which have excellent water, acid, alkali and weathering resistance.

The process of the present invention further reduces the color of oxalic acid catalyzed phenolic-acetaldehyde resins and, furthermore, provides a method of making resins which are initially light-colored. The resins are similar to those described in the above applications and heat-bleach when heated above 180° C. to a substantially lighter color, but since they are initially light-colored the heat-bleaching step is not essential but may be carried out if desired. In the process of making varnishes the resin and oil mixture is heated for some time above 180° C., and when this occurs, the resins which have not been previously heat-bleached do so in the varnish solution. Therefore, another phase of this invention besides producing light-colored heat-bleached resins, is the production of relatively light-colored potentially heat-bleachable resins, i. e., resins which lighten substantially in color when dissolved in drying oils and are heated above about 180° C.

The process of the present invention employs two catalysts, (1) oxalic acid which functions as the heat-bleaching agent as well as a condensing agent and (2) a strong mineral acid catalyst, preferably hydrochloric acid, which acts as a strong condensing agent. The reaction vessel may be constructed of earthenware, or any of the metals which are resistant to mineral acids at a low temperature. The resinification reaction takes place rapidly even at the relatively low temperatures employed yielding a hard, brittle resin in a short time. The process is especially adaptable for resinifying the simple phenols such as cresol, cresylic acid and xylenol with acetaldehyde. Carbolic acid may be employed in some cases but the higher-melting resins made from it are in general oil-insoluble, or only partially soluble in drying oils.

The process, therefore, comprises reacting, with cooling, a simple phenol and acetaldehyde in the presence of oxalic acid and a strong mineral acid to produce light colored resins which may be heat-bleached to a still lighter color, if desired, by heating them above about 180° C.

The process may be carried out in an open system under a reflux condenser, or the system may be closed, as, for instance, an autoclave. Since acetaldehyde liquid has a very low boiling point, about 20.8° C., it is desirable to use some such system as above and furthermore it is necessary to employ efficient cooling while the reaction is in progress.

The following are examples given to better illustrate the process of the present invention and the products derived there from; all proportions are in part by weight:

*Example 1.*—216 parts of a commercial mixture of meta and para cresols are mixed with 21.6 parts of oxalic acid and warmed until the acid has dissolved to form a clear solution. When the solution has been cooled to 20° C., 88 parts of liquid acetaldehyde are added. While agitating and cooling with circulated water at 20° C., 19 parts of 35% aqueous hydrochloric acid solution are run into the above solution slowly over a period of 65 minutes. At the end of this time a viscous resinous mass is obtained which hardens further if allowed to remain in contact with the catalyst for a longer time. At the end of 1½ hours, the resin is removed and washed with boiling water, yielding at room temperature a hard, brittle, light-brown material. The material is slowly heated up to 205° C. to dehydrate and harden. At 180° C. to 205° C., heat-bleaching occurs and the brown resin bleaches to a pale amber-colored mass. The resin prepared in this manner has an acid number of 53 and a softening point of 95° C. by the "ball and ring" method.

75 parts of the above resin are heated with 75 parts of raw tung oil up to 270° C. over a period of 25 minutes. 75 parts of raw tung oil are added and heating continued at about 240° C. for 45 minutes. The varnish base is cooled to 175° C. and thinned with a solvent composed of 107½ parts of VM & P naphtha, 100 parts of a hydrosolvent known to the trade as Solvesso #2 and 27½ parts of butyl acetate. 4½ parts of a 33⅓% solution of lead-cobalt naphthenate drier solution in VM & P naphtha (hereinafter referred to simply as drier solution) are added. The resulting varnish has a good brushing consistency and a very light color.

A normally soft resin may be hardened considerably by blowing it with steam. I have found that by blowing the resins of the present invention with superheated steam at approximately the heat-bleaching temperature, lighter color resins result than if the heat-bleaching were carried out in the open air.

*Example 2.*—366 parts of symmetrical xylenol are mixed with 36.6 parts of oxalic acid and warmed until the acid has dissolved. The solution is cooled to 20° C. and 132 parts of liquid acetaldehyde added. While agitating the solution and cooling with circulated water at 20° C., 15 parts of 35% aqueous hydrochloric acid solution are added slowly over a period of 84 minutes. At the end of this time a viscous mass is obtained which is allowed to harden further for 2 hours. The resin is removed, washed with water, then steam distilled at 205°–210° C. until a thick resin is obtained at the above temperature. The resin prepared in this manner is very hard, brittle and light-colored, possessing a softening point of 125° C. and an acid number of 72.

50 parts of the above resin are mixed with an equal weight of raw tung oil and heated up to 270° C. over a period of 25 minutes. 50 parts of raw tung oil are added and the heating continued at about 240° C. for 45 minutes. The varnish base is thinned with a solvent composed of 40 parts VM & P naphtha, 100 parts of Solvesso #2 and 10 parts of butyl acetate after it has been sufficiently cooled. 3 parts of drier solution are added yielding a very light-colored varnish solution.

I have found that in order to obtain light-colored resins which are easily heat-bleachable to extremely pale colored materials, it is generally necessary to first dissolve the oxalic acid in the phenolic constituent. If this is not done the resins are generally dark, or only relatively light-colored, when heated above 180° C.

*Example 3.*—336 parts of a commercial 97% straw-colored cresylic acid are mixed with 33.6 parts of oxalic acid and warmed until the acid has dissolved. The solution is cooled to 20° C. and 132 parts of acetaldehyde added. 15 parts of 35% aqueous hydrochloric acid solution are run into the above solution while it is being cooled to 20° C. and agitated with a mechanical stirrer. At the end of 2 hours a soft resinous mass is obtained which is hard and brittle at room temperature after it has been washed in boiling water. The resin is dark brown at this stage. It is heated slowly up to 205° C. to dehydrate and harden. At about 190°–205° C. the dark resin bleaches to a clear amber-colored mass. The resin prepared in this manner has a softening point of 75° C. and an acid number of 28.

75 parts of the above resin are mixed with 75 parts of raw tung oil and heated up to 270° C. over a period of 25 minutes. 75 parts of raw tung oil are added and heating continued at about 240° C. for 50 minutes. The varnish base is cooled to 175° C. and thinned with a solvent composed of 104 parts of VM & P naphtha and 131 parts of a hydrosolvent known as Solvesso #2. 4.5 parts of drier solution are added to yield a light-colored varnish of good brushing consistency.

Resins may also be made which are potentially heat-bleachable and which when dissolved in drying oils, heat-bleach when the solution is cooked.

*Example 4.*—216 parts of a commercial mixture of meta and para cresols are heated with 21.6 parts of oxalic acid until a clear solution results. The solution is cooled to 20° C. and 88 parts of acetaldehyde mixed in. 14 parts of 30% aqueous hydrochloric acid solution are added slowly while the mixture is being rapidly stirred and cooled. At the end of 1½ hours a soft resin is removed and washed in boiling water. The washed resin is dried in a vacuum oven at 86° C. and 28" of vacuum for 8 hours resulting in a light yellow resin which is hard and brittle at room temperature and possesses a softening point of 87° C. and an acid number of 35. If desired this resin may be heat-bleached to a lighter color by heating it above 180° C.

75 parts of the potentially heat-bleachable resin described above are heated with 75 parts of raw tung oil up to 270° C. over a period of 15 minutes. 75 parts of raw tung oil are added and heating continued at about 240° C. for 40 minutes. The varnish lightens noticeably in color when the temperature reaches 200° C. in the first heating. The varnish base is cooled to 175° C. and thinned with 112 parts of VM & P naphtha, 103 parts of Solvesso #2 and 20 parts of butyl acetate. 4.5 parts of drier solution are added yielding a light-colored, brushing varnish.

If desired a small amount of solvent may be added to the reaction mixture while forming the resin. This, however, is not necessary but serves the purpose of softening the resin which may become very viscous toward the end of the reaction.

Example 5.—324 parts of a commercial mixture of meta and para cresols are warmed with 32.4 parts of oxalic acid until the acid has dissolved. 50 parts of isopropanol are added and the solution cooled to 20° C. when 132 parts of acetaldehyde are mixed in. 15 parts of a 35% aqueous hydrochloric acid solution are run in while the above solution is being mechanically stirred and cooled to 20° C. with circulated water. In about 2 hours a viscous resin forms which is removed and washed with boiling water. The resin is dehydrated in a vacuum oven at 86° C. and 28 inches of vacuum for 8 hours. A hard, potentially heat-bleachable amber-colored resin results having a softening point of 108° C. and an acid number of 38.

75 parts of the above potentially heat-bleachable resin are heated with 75 parts of raw tung oil up to 270° C. over a period of 21 minutes. 75 parts of raw tung oil are added and heating continued at about 235° C. for 46 minutes. The varnish base is cooled to 150° C. and thinned with 105 parts of VM & P naphtha, 105 parts of Solvesso #2 and 25 parts of butyl acetate. 4.5 parts of drier solution are added yielding a light-colored, rapid drying varnish. During the first heating of the above varnish base a very noticeable lightening in color occurs due to the heat-bleaching of the resin in oil solution when heated above 180° C.

It is sometimes advisable and necessary, especially where very large batches of resin are being made, to provide very efficient cooling of the reaction mixture. This may be accomplished by employing externally circulated refrigerant such as ice water or cold brine solution, or the cooling agent may be passed through pipes in contact with the reaction mixture. Another method of cooling would be to add blocks of ice to the resinifying mixture from time to time. Since the reaction is exothermic and is dependent upon the concentration of the mineral acid catalyst, the reaction may be controlled by the rate of addition of the mineral acid catalyst and by its strength.

Example 6.—324 parts of a commercial mixture of meta and para cresol are warmed with 32.4 parts of oxalic acid until a clear solution results. The warm solution is cooled to 15° C. with ice water and 132 parts of acetaldehyde liquid added. While agitating the solution and cooling by means of circulated ice water at 15° C., 15 parts of a 15% aqueous hydrochloric acid solution are run in over a period of 65 minutes. A viscous resin is obtained in 2 hours which is removed and washed with boiling water. The resin is then steam distilled at 200°–210° C. to dehydrate, harden and heat-bleach. The resin prepared in this manner is hard and extremely pale in color. It has a softening point of 124° C. and an acid number of 46.

75 parts of the above resin are mixed with 75 parts of tung oil and heated up to 270° C. over a period of 16 minutes. 75 parts of tung oil are added and heating continued at about 240° C. over a period of 48 minutes. The varnish base is cooled to 160° C. and thinned with 130 parts of VM & P naphtha, 95 parts of Solvesso #2 and 10 parts of butyl acetate. 4½ parts of drier solution are added yielding a light-colored, resistant varnish.

The proportion of oxalic acid used as the bleaching catalyst in making the resins of the present invention is not fixed but may be varied between wide limits. Usually an amount between about 2% and 10% based on the phenol will yield oil-soluble resins of excellent color.

Example 7.—216 parts of a commercial mixture of meta and para cresols are warmed with 10.8 parts of oxalic acid until a clear solution results. This solution is cooled to about 20° C. and 88 parts of acetaldehyde added. 15 parts of a 25% aqueous hydrochloric acid solution are added slowly over a period of 70 minutes while the mixture is being cooled to 20° C. At the end of this time a viscous resinous mass is obtained which is allowed to harden further. In 2 hours the resin is removed, washed in boiling water and heated up to 205° C. to dehydrate and harden. At about 190° C. the molten mass suddenly bleaches yielding when cool a pale amber-colored resin having an acid number of 48 and a softening point of 118° C.

60 parts of the above resin are mixed with 40 parts of tung oil and 20 parts of bodied linseed oil and heated up to 270° C. over a period of 27 minutes. The solution is cooled to 250° C. and the temperature held between 250°–255° C. for 15 minutes. When the varnish base has cooled to 150° C., it is thinned with 90 parts VM & P naphtha and 30 parts of Solvesso #2. 2.4 parts of drier solution are added to give a clear, light-colored varnish which dries rapidly to a hard, glossy finish.

By employing a more dilute mineral acid the resinification reaction is slower but generally the resulting resins are lighter in color than when more concentrated solutions are used. It is therefore advisable when making a light-colored, potentially heat-bleachable resin to use a dilute mineral acid, since the heat-bleaching step is not carried out on the resin itself before it is made into a varnish.

Example 8.—216 parts of a commercial mixture of meta and para cresols are warmed with 21.6 parts of oxalic acid until the acid has dissolved to form a clear solution. The solution is cooled to about 20° C. and 88 parts of liquid acetaldehyde added. While the resulting solution is being agitated and cooled to 20° C. with circulated water 15 parts of a 15% aqueous hydrochloric acid solution are run in over a period of 70 minutes. In about 2½ hours the resin is removed and washed thoroughly with boiling water. It is then dehydrated in a vacuum oven at 86° C. and 28 inches of vacuum. The resin produced in this manner is pale amber-colored, has an acid number of 28 and a softening point of 99° C.

It may be bleached to a still lighter color by heating above 180° C.

75 parts of the above resin are heated with 75 parts of raw tung oil up to 270° C. over a period of 36 minutes. When the temperature reaches 190° C. a noticeable lightening occurs in the varnish which is due to the resin being heat-bleached. 75 parts of raw tung oil are added and heating continued at about 240° C. for 38 minutes. The varnish base is cooled and thinned with 100 parts of VM & P naphtha, 117 parts of Solvesso #2 and 18 parts of butyl acetate. 4½ parts of drier solution are added to give a fast drying, light-colored, resistant varnish.

Although hydrochloric acid is the preferred condensing agent any strong mineral acid may be employed which will catalyze the reaction. It is desirable to remove the mineral acid entirely from the resin after the reaction since resins containing acid appear to yield varnishes which darken slightly upon exposure to light. To completely remove the acid a mixer of the Banbury or Werner-Pfleiderer type may be used so that thorough mixing of the resin and water is obtained, or the acid may be neutralized by suitable basic materials.

*Example 9.*—216 parts of a commercial mixture of meta and para cresols are warmed with 21.6 parts of oxalic acid until a clear solution results. The solution is cooled to about 20° C. and 88 parts of liquid acetaldehyde added. While agitating and cooling the solution with circulated water at 20° C., 24.6 parts of a 25% aqueous sulphuric acid solution are run in over a period of 85 minutes. After 3 hours the resin is removed and washed with water. It is then dehydrated and hardened by heating to 205° C. Heat-bleaching occurs at 180°–190° C. to yield a clear, hard, brittle, pale-colored resin.

75 parts of the above resin are heated with 75 parts of raw tung oil up to 270° C. over a period of 20 minutes. 75 parts of raw tung oil are added and heating continued at 250° C. for about 40 minutes. The varnish base is cooled and thinned with 135 parts of VM & P naphtha and 100 parts of Solvesso #2. 4½ parts of drier solution are added to yield a light-colored varnish of good brushing consistency.

Varnishes made from the resins of the present invention show extraordinary resistance to the action of chemical agents such as acids, alkalies, corrosive fumes and petroleum solvents as well as excellent resistance to weathering, the action of direct sunlight and water. Besides being readily soluble in tung oil, the resins dissolve in all drying oils in practically all proportions. Among the drying oils which may be employed are oiticica, linseed, soy bean and perilla oil as well as the unsaturated fish oils and synthetic drying oils from petroleum or from dehydrated castor oil. After the oil-resin composition has been heat-treated it may be dissolved in and thinned with any appropriate solvent such as VM & P naphtha, hydrogenated petroleum solvents such as those known to the trade as Solvesso, xylol, turpentine, alcohol, butyl acetate and the like.

Varnishes made with a preponderant amount of a more unsaturated drying oil of the type of tung and oiticica oil readily harden when exposed to the air in thin films. Within certain limits the rapidity of hardening is proportional to the amount of cobalt drier contained in the varnish, it having been found that very small amounts yield rapid drying varnishes. In some cases, especially where the varnish has been ground with pigments to give brushing or spraying enamels, no drier whatsoever is necessary since the oil-resin composition hardens sufficiently rapidly to give a fast drying enamel. Driers may be added to the cold varnish compositions in the form of soluble naphthenates, or they may be added while the varnish is being cooked in the form of metallic soaps, or organic or inorganic salts. In general the varnish compositions of the present invention exhibit great stability of color when exposed to sunlight.

As well as being used in varnishes the oil-resin bases of the present invention may be employed to impregnate, or coat the surface of fabrics and paper for waterproofing or in the production of oil-cloth, linoleum and the like. In relatively thin films, the compositions may be hardened by heat or heat and pressure instead of air-hardened. When ground with pigments resistant, stable enamels are obtained.

The resins of the present invention are unique in that they may be made initially light-colored. One of the reasons why phenolic-acetaldehyde resins have not been developed commercially to the same degree as phenolic-formaldehyde resins in the past has been the extreme darkness of the resins. However, since my discovery of the remarkable heat-bleaching phenomenon which yields resins of excellent pale color through the use of oxalic acid as a catalyst or co-catalyst a wide field for phenolic-acetaldehyde resins has been opened. The process of the present invention is still another step in the general development of these resins made possible by the important heat-bleaching discovery. This process produces initially light-colored resins which further possess the property of bleaching to a lighter color when heated above 180° C.

Besides oxalic acid, the oxalates such as ethyl and butyl oxalate may be employed as bleaching catalysts. Although hydrochloric acid is the preferred strong condensing agent, other acids such as hydrobromic, sulphuric and fluorsilicic acid may be used.

Another characteristic exhibited by the resins of the present invention is their property of hardening into infusible bodies upon protracted baking in thin films at 150°–170° C.

To recapitulate, the process of the present invention comprises reacting, with strong cooling, the simple phenols with acetaldehyde in the presence of both a bleaching catalyst, such as oxalic acid, and a strong mineral acid such as hydrochloric acid to produce initially relatively light-colored resins possessing the property of bleaching to a substantially lighter color when heated above about 180° C.

As well as acetaldehyde the polymers of acetaldehyde may be employed, such as paraldehyde, metaldehyde and the like. Mixtures of acetaldehyde and formaldehyde, butylaldehyde or the higher molecular weight aldehydes can be used in the production of heat-bleachable, initially light-colored resins made by the process of the present invention. In the claims where acetaldehyde is referred to the term is meant to include the polymers of acetaldehyde as well as the monomeric form.

In some cases the employment of oxalates as bleaching catalysts gives lighter colored resins than when oxalic acid is used. Thus, in Example 1, when I substitute ethyl oxalate for oxalic acid a hard resin is obtained which when heated above 180° C. yields a heat-bleached phenolic-acetaldehyde resin of exceptionally light color. If carbolic acid ($C_6H_5OH$) is used as the phenolic constituent in the process of the present invention, care should be taken not to carry the hardening of the resin too far, if an oil-soluble resin is desired. However, if the resins are intended as binders for molding compositions in which a hardening agent such as paraformaldehyde or hexamethylenetetramine have been included, any of the simple phenolic-acetaldehyde resins, including hardened carbolic acid-acetaldehyde resins, may be employed.

When the resins of the present invention are heated with requisite amounts of drying oils, homogeneous reaction products of the resin and drying oil are generally obtained, as is indicated by the fact that the resin cannot be extracted from the oil after heat treatment has taken place. Where the phenolic constituent contains at least one hydrocarbon substituent, of one or more carbon atoms, the resulting resin yields homogeneous reaction products when heated with drying oils. However, when carbolic acid is used to secure an oil-soluble resin the resin should not be hardened too much as otherwise the heat-treated drying oil products are not entirely homogeneous and satisfactory varnishes cannot be obtained.

What I claim is:

1. The process of making initially light colored and glyceride oil soluble phenolic acetaldehyde resins which comprises dissolving oxalic acid in a phenol of the class consisting of phenol, cresol, xylenol and cresylic acid, and then reacting the phenol containing the oxalic acid with acetaldehyde in the presence of a strong mineral acid while cooling to produce a resin which is adapted to be bleached when heated above 180° C.

2. The process of making initially light colored and glyceride oil soluble cresol acetaldehyde resins which comprises dissolving oxalic acid in cresol, and then reacting the cresol containing the oxalic acid with acetaldehyde in the presence of a strong mineral acid while cooling to produce a resin which is adapted to be bleached when heated above 180° C.

3. The process of making initially light colored and glyceride oil soluble xylenol acetaldehyde resins which comprises dissolving oxalic acid in xylenol, and then reacting the xylenol containing the oxalic acid with acetaldehyde in the presence of a strong mineral acid while cooling to produce a resin which is adapted to be bleached when heated above 180° C.

4. A resin which is substantially identical with that made in accordance with the process of claim 1.

5. A resin which is substantially identical with that made in accordance with the process of claim 2.

6. A resin which is substantially identical with that made in accordance with the process of claim 3.

7. A process of making initially light-colored and oil soluble phenolic acetaldehyde resin which comprises dissolving one of the class consisting of oxalic acid and an alkyl ester of oxalic acid in a phenol of the class consisting of phenol, cresol, xylenol and cresylic acid, reacting the phenol with acetaldehyde in the presence of a strong mineral acid while cooling, and then heating the resin produced above 180° C. to bleach the same.

8. A resin which is substantially identical with that made in accordance with the process of claim 7.

9. A homogeneous product which is substantially identical with the reaction product formed by heating together the resin produced by the process of claim 7 and a glyceride oil.

10. An initially light-colored resin produced by dissolving one of the class of oxalic acid and alkyl oxalates in a phenol of the class consisting of phenol, cresol, xylenol and cresylic acid, reacting said phenol with acetaldehyde in the presence of a strong mineral acid while cooling the mixture, and the thus produced resin is then steam distilled until it is bleached to a substantially lighter shade.

JOHN B. RUST.